US009756781B2

(12) United States Patent
Zerbarini

(10) Patent No.: US 9,756,781 B2
(45) Date of Patent: Sep. 12, 2017

(54) HORIZONTAL ROTARY MOWER WITH MULTI-DUCTILITY BLADES

(71) Applicant: HRM Enterprises, Inc., Westerly, RI (US)

(72) Inventor: Richard Zerbarini, Westerly, RI (US)

(73) Assignee: HRM Enterprises, Inc., Westerly, RI (US)

( * ) Notice: Subject to any disclaimer, the term of this patent is extended or adjusted under 35 U.S.C. 154(b) by 0 days.

(21) Appl. No.: 15/401,982

(22) Filed: Jan. 9, 2017

(65) Prior Publication Data

US 2017/0112052 A1    Apr. 27, 2017

Related U.S. Application Data

(63) Continuation of application No. 13/768,856, filed on Feb. 15, 2013, now Pat. No. 9,538,704.

(51) Int. Cl.
| A01D 34/52 | (2006.01) |
| A01D 34/53 | (2006.01) |
| A01D 34/44 | (2006.01) |
| A01D 34/47 | (2006.01) |
| A01D 34/49 | (2006.01) |
| A01D 34/62 | (2006.01) |
| A01D 101/00 | (2006.01) |

(52) U.S. Cl.
CPC ............ *A01D 34/52* (2013.01); *A01D 34/44* (2013.01); *A01D 34/475* (2013.01); *A01D 34/49* (2013.01); *A01D 34/62* (2013.01); *A01D 2101/00* (2013.01)

(58) Field of Classification Search
CPC ...... A01D 34/13; A01D 34/52; A01D 34/736; B23B 27/148; B23B 2226/27
See application file for complete search history.

(56) References Cited

U.S. PATENT DOCUMENTS

| 3,525,375 | A | * | 8/1970 | Heising | ................. | A01D 75/00 241/222 |
| 3,673,773 | A | * | 7/1972 | Ferguson | ............... | A01D 34/42 415/53.1 |
| 4,109,447 | A | * | 8/1978 | Ferguson | ............... | A01D 34/49 56/13.3 |
| 4,209,137 | A | * | 6/1980 | McAllister | ........... | A01F 29/095 241/221 |
| 5,878,970 | A | * | 3/1999 | Leeb | .................... | A01F 29/095 241/294 |
| 5,941,469 | A | * | 8/1999 | Spiegemacher | ...... | A01F 29/095 241/291 |
| 2004/0172931 | A1 | * | 9/2004 | Kolb | .................... | A01D 34/52 56/249 |
| 2013/0219847 | A1 | * | 8/2013 | Miller | ................... | A01D 41/16 56/156 |

FOREIGN PATENT DOCUMENTS

DE    EP 0101844 A1 *  3/1984  ............ A01F 29/06

* cited by examiner

*Primary Examiner* — Árpád Fábián-Kovács
(74) *Attorney, Agent, or Firm* — Suiter Swantz pc llo

(57) ABSTRACT

A lawnmower with a plurality of blade holding elements in a horizontally rotating blade assembly holds a plurality of multi-ductility blades with a maximum thickness of 0.075 inches in a blade channel and in a substantially tangential orientation. The multi-ductility blades include a hardened cutting edge of Rockwell hardness greater than 50 and ductile portion with Rockwell hardness less than 50.

18 Claims, 15 Drawing Sheets

HORIZONTAL ROTARY MOWER WITH MULTI-DUCTILITY BLADES

PRIORITY

The present application claims the benefit under 35 U.S.C. §120 of U.S. patent application Ser. No. 13/768,856 (filed Feb. 15, 2013), now U.S. Pat. No. 9,538,704, which is incorporated herein by reference.

FIELD OF THE INVENTION

The present invention is directed generally toward lawnmowers and more particularly to lawnmower blades and blade housings.

BACKGROUND OF THE INVENTION

Lawnmowers traditionally come in two varieties: rotary mowers, where blades rotate horizontally in a plane; and reel mowers, where helical blades rotate about an axis so that the helical blades can shear grass against a bedknife.

Rotary mowers have blades with a small cutting area, and the blades require very fast tip speeds to perform well. Typical tip speeds are greater than fifteen thousand feet per minute to achieve an acceptable cut, even when blades are sharp. Foreign objects struck by blades at these velocities can be very dangerous. Even though rotary mower decks and collection bags must be designed in accordance with various safety standards to minimize the risk of injury due to flying objects, many injuries still occur from ejected objects even when safety measures are in place.

In addition, many injuries occur from the blades themselves. Rotary mower blades are very large and heavy and will inflict grievous injury even at low speeds. Furthermore, decks for these blades are completely open underneath to accommodate the circular cut area and the need for the blades to cut at their tips. This large, open area increases the risk of foot, hand, or other body part mutilation, and increases the risk of the blades striking a foreign object.

Reel mowers have multiple helical blades (usually five) that rotate about a horizontal shaft; a stationary bedknife provides a shearing surface for the helical blades. The rotating helical blades of a reel mower typically operate at a lower speed than the blades of a rotary mower, but reel mowers are precision instruments that require frequent adjustment and precise operating conditions such as rotational speed and forward velocity. Reel mowers are also dangerous. Reel mowers must expose the entire front of the rotating helical blades to allow the blades to feed grass against a bedknife. Even while not in operation the helical blades may cause injury. In operation, accidental contact with a spinning helical blade will pull a hand or foot into the bedknife.

Consequently, there is a need for a mower with a shielded and less exposed blade assembly to reduce the risk of injury.

Typical rotary lawn mower blades are generally heavy, flat elongated pieces of steel that rotate symmetrically about a rotatable vertical shaft. Rotary lawn mower blades have a sharpened leading edge, and the outer portion of the trailing edge is curved to create an airflow to lift grass and blow clippings into a bag or out of a discharge passage. The leading edge becomes dull very quickly. When the leading edge is dull, even though the blade appears to be cutting, the blade is actually smashing and tearing grass. Smashing and tearing leaves grass bruised and with ragged, torn edges. Damaged grass develops brown, unpleasant looking tips, and is more susceptible to disease. Reel mowers traditionally provide a clean cut through a shearing action. Reel mower blades still have to be sharp to perform well.

Rotary and reel mowers also suffer from issue related to maintenance. Wear on mower blades, either due to ordinary use or damage from foreign objects, requires them to be sharpened or replaced regularly. Replacing the blades in lieu of sharpening can be expensive.

To sharpen rotary mower blades, they generally must be removed from the power train. Because rotary mower blades are usually located under a mower deck, removing them is often a difficult, time consuming task. If is especially difficult on larger riding type mowers because the mowers are very heavy; removing blades may require ramps, a hoist or a jack to gain access. Reel mower blades cannot typically be sharpened without special sharpening equipment or the assistance of a professional and reference to a table of reel and bedknife grinding guidelines. Consequently, there is a need for a low cost disposable alternative that is easier to replace and alleviates the need for sharpening.

SUMMARY OF THE INVENTION

Accordingly, the present invention is directed to a novel lawn mowing apparatus with a shielded blade assembly, configured to use very sharp, inexpensive disposable blades.

In one embodiment of the present invention, a lawnmower blade assembly is configured to hold several replaceable blades. The blade assembly rotates about an axis parallel to the ground. Blades are held by the blade assembly with the cutting edge of each blade oriented in the direction of rotation. As the assembly rotates, the blades cut grass directly beneath the blade assembly.

In another embodiment of the present invention, a blade assembly guard conceals blades held in a rotating blade assembly. Blades are only exposed during periods when they are near the ground and may be effective to cut grass.

In another embodiment of the present invention, replaceable lawnmower blades are configured to be held in a blade assembly. The replaceable blades are held in such a way as to orient the cutting edge of each blade in the direction of rotation of the assembly.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

In at least one embodiment of the present invention, a lawnmower utilizes a horizontally rotating blade assembly with the cutting edge of each blade in the blade assembly facing in the direction of rotation. Blades in the blade assembly are thin and have an edge geometry that is at a small angle; therefore, the blades continue to work effectively longer than blades in prior art lawnmowers producing a far superior cut. Because of the orientation of the blade assembly, the sharpness of the blade edge and the configuration of blades in the blade assembly, the blade assembly may operate at a lower, safer speed as compared to rotary lawnmowers and the blade assembly does not require a stationary straight blade or an open front like a reel mower. The blade assembly may also be largely contained within a blade assembly guard to prevent accidental contact with blades.

Figure 1:
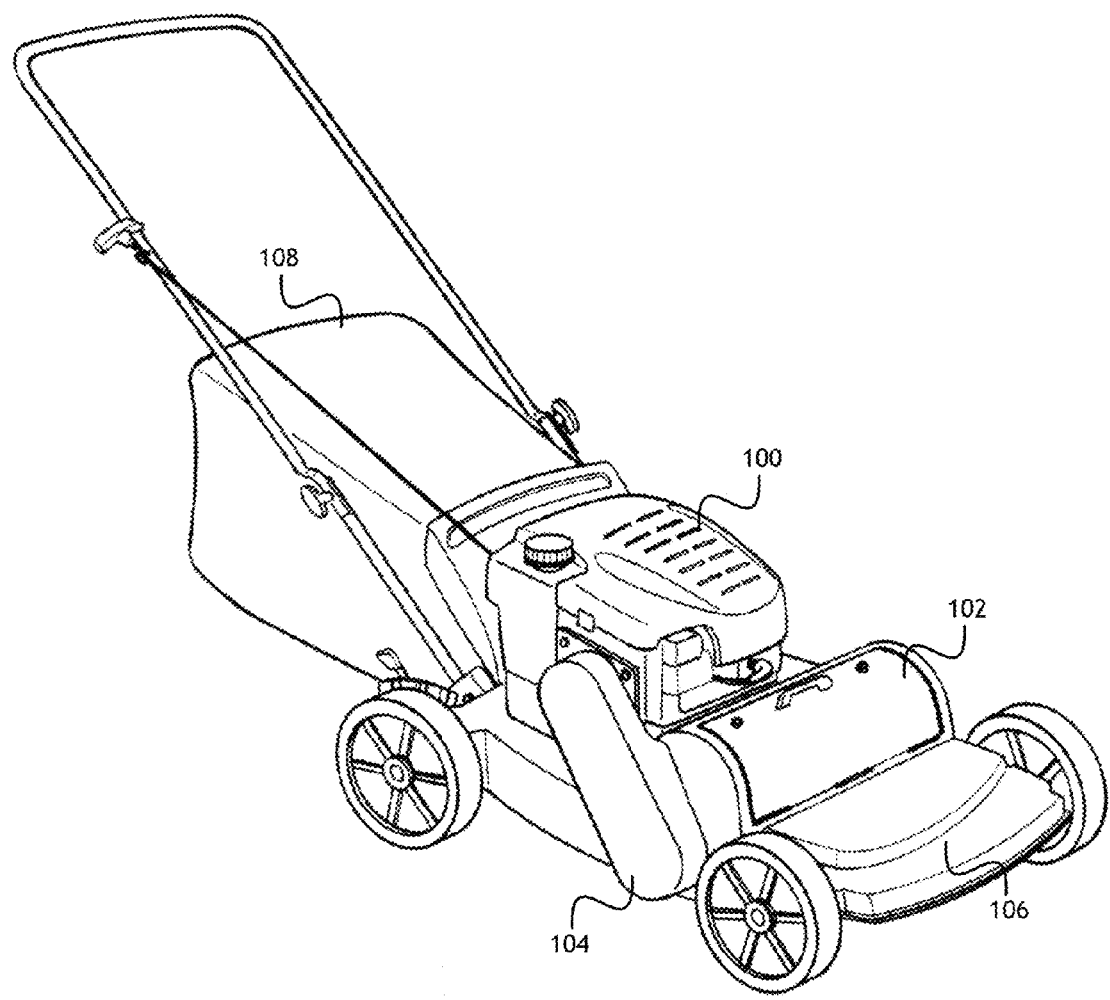
FIG. 1 shows a perspective view of a push type lawnmower with a blade assembly guard according to at least one embodiment of the present invention.

Referring to FIG. 1, a perspective view of a push type lawnmower with a blade assembly guard according to at least one embodiment of the present invention is shown. The lawnmower includes a drive mechanism 100 such as a gasoline or electric motor. The drive mechanism 100 powers the rotation of a blade assembly (here concealed by a blade assembly guard 106). The drive mechanism 100 may engage the blade assembly through some type of drive train such as a belt or power take-off (here concealed by a drive shield 104). The lawnmower may also include a clippings bag 108 to collect and dispose of clipping generated by the blade assembly.

Replacement or maintenance of blades in the blade assembly may be facilitated by a blade assembly access panel 102 located on the easily accessible upper portion of the blade assembly guard 106. By contrast, rotary mower blade maintenance must be accomplished by either tipping the mower deck on its side for smaller units or from below for larger mowers.

Figure 2:
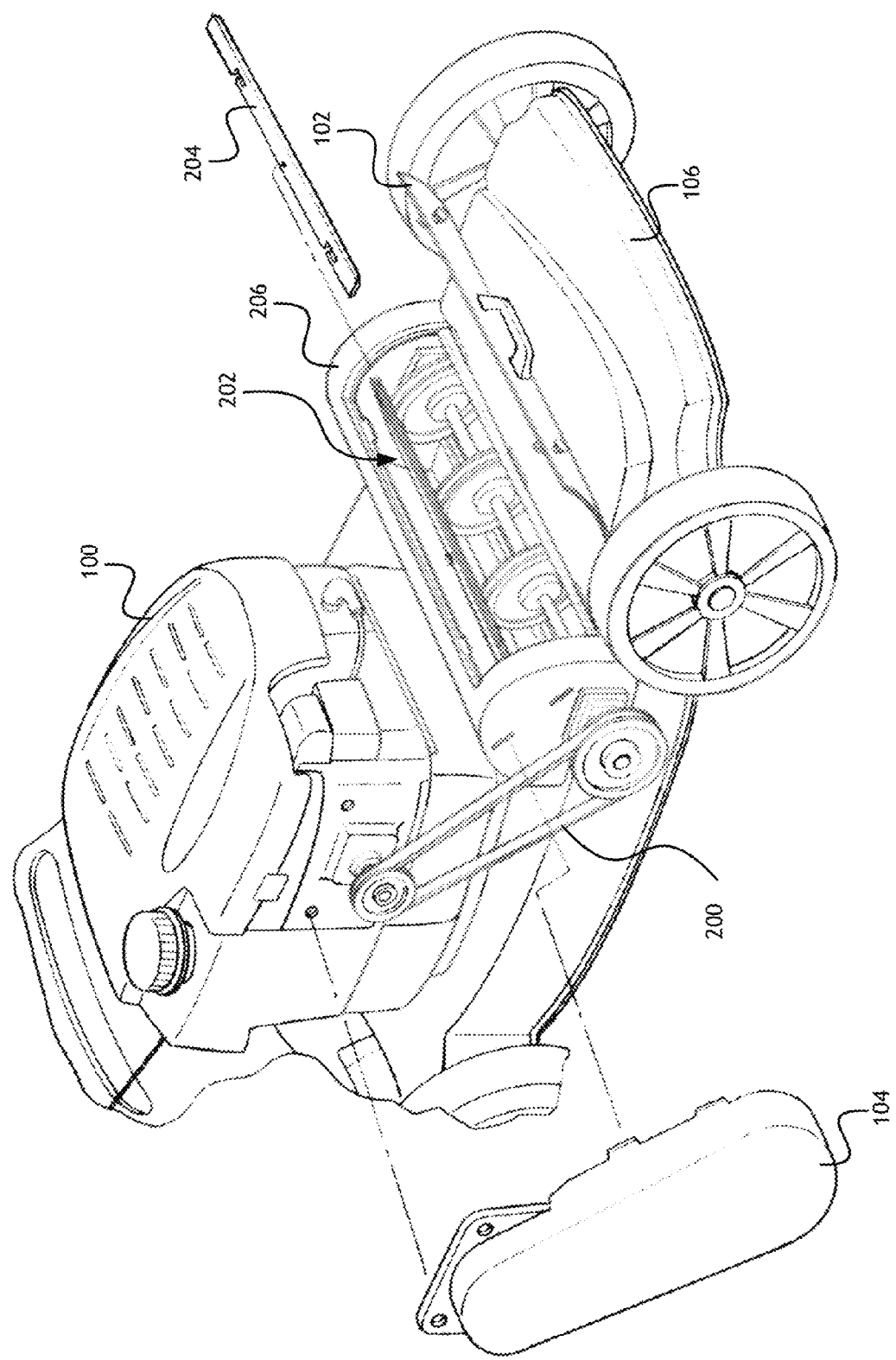
FIG. 2 shows a perspective, exploded view of the push type lawnmower shown in FIG. 1, having a blade assembly according to at least one embodiment of the present invention.

Referring to FIG. 2, a perspective, exploded view of the push type lawnmower shown in FIG. 1, having a blade assembly according to at least one embodiment of the present invention is shown. The drive mechanism 100 is connected to a blade assembly 202 by a transfer belt 200. The transfer belt 200 may be covered by a drive shield 104 to prevent injuries due to contact with the transfer belt 200 and to protect the integrity of the transfer belt 200 during operation.

The blade assembly 202 may be covered by a blade assembly guard 106 that prevents exposure of blades 204 in the blade assembly 202 except as necessary for grass cutting as more fully described herein. The blade assembly guard 106 may also function as a superstructure for the lawnmower (like a traditional mower deck), creating a sufficient wheelbase for even mowing. The blade assembly guard 106 may include a ducting portion 206 to closely surround the blade assembly 202 and maintain an airflow produced by the blade assembly 202 during operation to direct grass clippings.

The blade assembly guard 106 may include a blade assembly access panel 102 to access the blade assembly 202 for maintenance and replacement of blades 204. In at least one embodiment, a horizontal blade 204 arrangement in the blade assembly 202 allows access from above. A blade assembly access panel 102 may allow blades to be replaced quickly.

Figure 3:
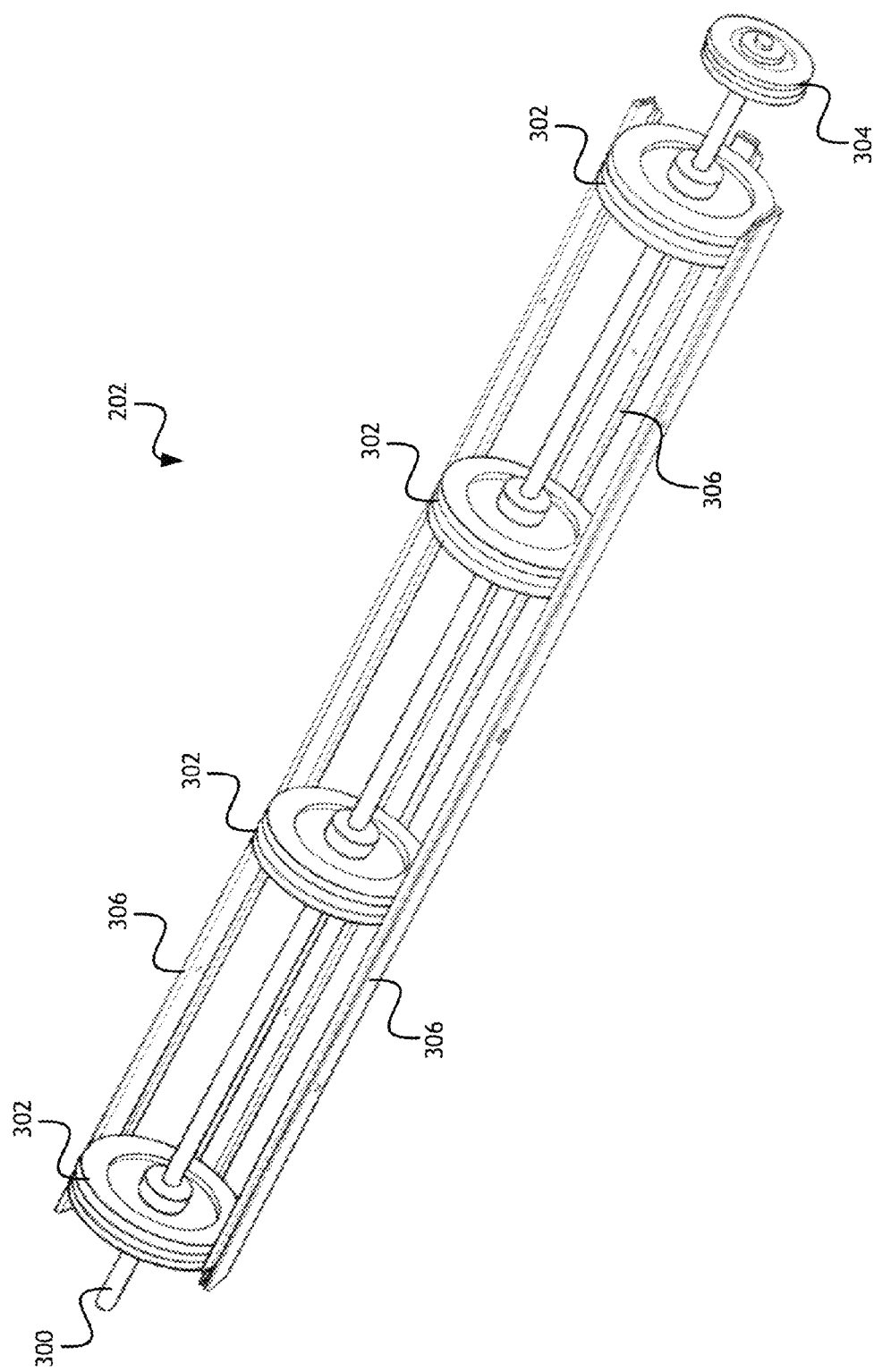
FIG. 3 shows a perspective view of a blade assembly according to at least one embodiment of the present invention.

Referring to FIG. 3, a perspective view of a blade assembly 202 according to at least one embodiment of the present invention is shown. The blade assembly 202 may include a shaft 300 connected to a rotor 302 or a plurality of rotors 302. The rotors 302 provide attachment surfaces for a plurality of blade clamps 306. Each blade clamp 306 is configured to hold a blade such that the cutting edge of the blade faces the direction of rotation of the blade assembly 202 when the blade assembly 202 is in operation. While FIG. 3 illustrates a plurality of blade clamps 306, other blade holding elements may be used to implement embodiments of the present invention. The blade assembly 202 may also include a drive engaging mechanism 304 to facilitate a connection between the shaft 300 and a drive mechanism; for example, the drive engaging mechanism 304 may be a belt wheel to receive a drive belt connected to a motor.

Figure 4:
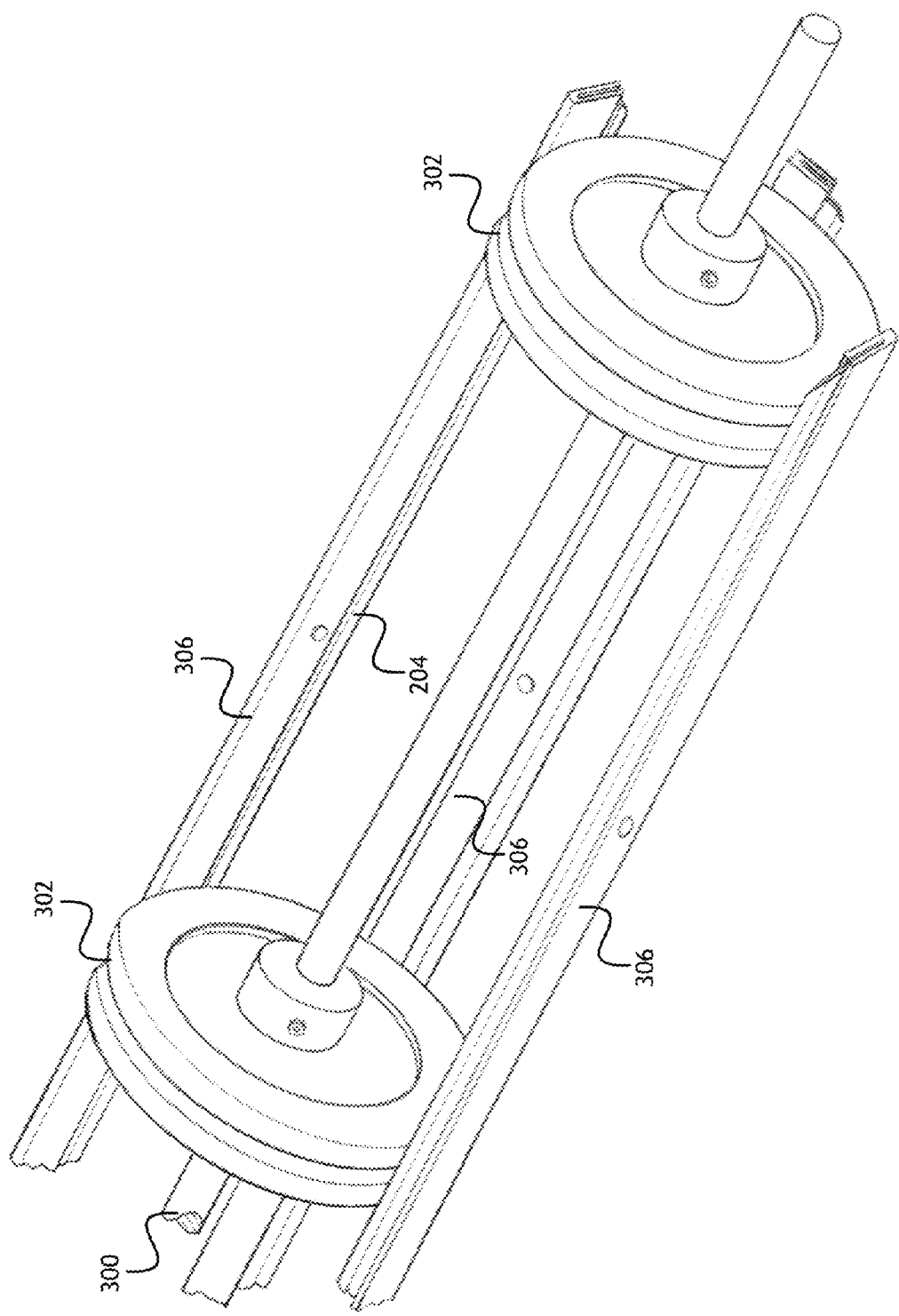
FIG. 4 shows a perspective, close-up view of a portion of the blade assembly shown in FIG. 3.

Referring to FIG. 4, a perspective, close-up view of a portion of the blade assembly shown in FIG. 3 is shown. A shaft 300 connected to two rotors 302 spins the rotors 302 about an axis defined by the shaft 300. Blade clamps 306 connected to the rotors 302 thereby rotate about an axis defined by the shaft 300. Each blade clamp 306 is configured to hold a blade 204 such that the cutting edge of each blade 204 faces the direction of rotation during normal operation.

As described more fully herein, a blade assembly according to the present invention allows for inexpensive, replaceable blades 204. Whereas the blades of prior art rotary mowers are required to have certain characteristics of mass and ductility based on their mode of operation and tip speed to meet certain safety standards and testing requirements, blades 204 according to at least one embodiment of the present invention essentially comprise only a cutting edge. Blade 204 edges according to at least one embodiment of the present invention may be harder and sharper than prior art blades.

Figure 5:
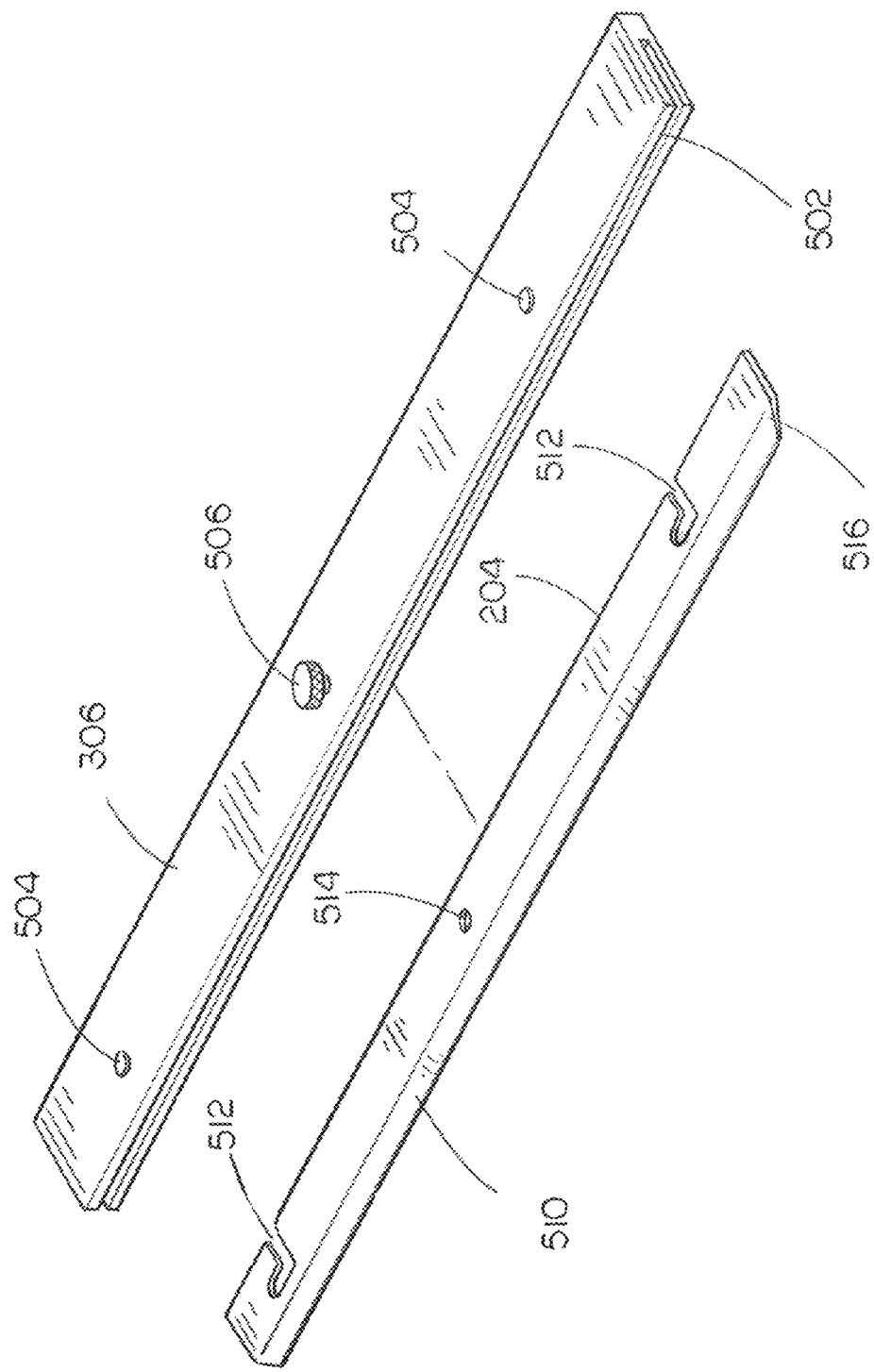
FIG. 5 shows a perspective view of a blade and blade clamp according to at least one embodiment of the present invention.

Referring to FIG. 5, a perspective view of a blade 204 and blade clamp 306 according to at least one embodiment of the present invention is shown. A blade clamp 306 may define a blade channel 502 to hold and orient a blade 204 in a blade assembly. The blade clamp 306 may include one or more locking pins 504 and one or more locking screws 506. While locking pins 504 and locking screws 506 are specifically described and shown, other fastening or clamping mechanisms suitable for retaining blades 204 in the blade channel 502 may be used. Locking pins 504 engage locking pin grooves 512 in a blade 204 and help ensure the blade 204 is oriented and positioned correctly in the blade clamp 306. Locking screws 506 may engage a threaded portion of a blade 204 or pass through a locking screw hole 514 in a blade 204 and engage a threaded portion (not shown) of the blade clamp 306. Locking screws 506 ensure that the blade 204 is secure in the blade clamp 306 and remains in the correct orientation.

Because blades 204 according to at least one embodiment of the present invention are harder and sharper than prior art blades, they may operate at lower speeds, in the range of two thousand to sixty-five hundred feet per minute. In one embodiment, a shaft driving a blade assembly may rotate at an angular velocity of between three thousand and five thousand rotations per minute. Where a blade assembly has a diameter of five inches, such angular velocity may translate to a linear blade tip velocity of two thousand to sixty-five hundred feet per minute. The ANSI limit for mower blade tip speed is nineteen thousand feet per minute.

In one exemplary embodiment, the blades 204 travel at approximately sixty-two hundred feet per minute. Where a blade assembly has a diameter of 5.25 inch, a horizontal rotary mower engine would operate at approximately seventeen hundred rotations per minute. A motor turning at seventeen hundred rotations per minute with a 5.25 inch engine drive pulley driving a blade assembly with a 2.00 inch drive engaging mechanism will drive the blades 204 at approximately sixty-two hundred feet per minute (with the blade assembly rotating at forty-five hundred rotations per minute). Seventeen hundred rotations per minute is a fast idle for most internal combustion four-cycle mower engines.

Such an exemplary embodiment of the present invention has approximately one-third (⅓) the blade tip speed of a common rotary mower (nineteen thousand feet per minute ANSI limit). A common rotary mower with a vertical engine directly driving a twenty-one inch blade must turn at approximately thirty-three hundred rotations per minute (near some engines maximum operating limit of four thousand rotations per minute) to produce a blade tip speed of approximately eighteen thousand feet per minute. At such engine and blade tip speeds, common rotary mowers produce significant noise and air pollution (ninety dB and as much hydrocarbons and nitrogen oxides as four cars driven for the same length of time).

Furthermore, because the blades 204 are inserted into a blade clamp 306, they may be easily replaceable. For example, in at least one embodiment, the blades 204 are modified utility knife blades. Such blades 204 may include one or more locking pin grooves 512 and one or more locking screw holes 514 depending on the corresponding blade clamp 306. Blades 204 may also have truncated edge tips 516 at each end of the blade 204 for safety as sharp cutting points are not necessary. In at least one embodiment of the present invention, where a locking screw 506 is operable by hand, blades 204 may be replaceable without any tools.

Rotary blades require a high tip speed, in the range of fifteen to nineteen thousand feet per minute, to adequately cut. Because of the high tip speed, rotary blades must be made from heavy gage, soft, ductile steel to meet ANSI test standards and other safety requirements. Hardness is the primary factor that affects blade sharpness retention, so sharpness of rotary blades degrades quickly because they must be made of ductile steel (less than Rockwell C 40 steel). Typically rotary blades are used for a season or more and are sharpened multiple times during their useful life. Sharpening is not technically difficult but takes time; and if rotary blades are not sharpened regularly, cut quality suffers.

Because blades 204 in embodiments of the present invention operate at lower tip speed (between two thousand and sixty-five hundred feet per minute in some embodiments of the present invention as compared to nineteen thousand feet per minute in prior art mowers) the power source driving the blades 204 may be less powerful, operate more efficiently and operate at significantly lower engine speed. Less powerful, more efficient power sources may be lighter and more environmentally friendly as compared to motors used in prior art mowers.

Reel mowers use hardened helical blades but because of the type of cutting action (shearing) they require a technically difficult and time-consuming process to sharpen the blades and adjust the blade alignment. That process usually requires a trained professional.

Blades 204 according to at least one embodiment of the present invention may be manufactured using a very cost effective process similar to the manufacture of utility knife blades. In at least one embodiment of the present invention, blades 204 may be made of 1095 grade carbon steel.

Blades 204 useful in embodiments of the present invention may have a hard cutting edge 510 but be ductile otherwise so that the blade 204 will bend and not break if it strikes a foreign object. To harden the cutting edge 510, the process should achieve a hardness of Rockwell C 60 or greater to a depth of 0.003 to 0.004 inches in from the cutting edge 510. A cutting edge with hardness between Rockwell C 55 and Rockwell C 60 also has some edge retention capabilities and may be sharpened using conventional methods. The edge sharpness retention capability increases and the sharpening difficulty also increases from Rockwell C 55 to Rockwell C 60. Above Rockwell C 60 edge retention is excellent but sharpening is very difficult. The hardness would transition back to the soft material at around 0.015 inches in from the cutting edge 510. In at least one embodiment, the blade 204 may also be treated for corrosion resistance.

Rotary mower blades do not exceed a hardness of Rockwell C 40 and are mostly in the mid to upper Rockwell C 30's. Above Rockwell C 40, steel will become brittle enough to fracture or break instead of bending or deforming. Rockwell C 40 will not retain an edge. A hardness above Rockwell C 60 is desirable for sharpness retention, but a blade that hard would be difficult if not impossible to sharpen by normal means and may require diamond grit stones. Disposable blades solve this problem.

Blades 204 according to at least one embodiment of the present invention retain a soft body with a hardness below Rockwell C 40 and in some embodiments below Rockwell C 20. Only a very small portion of each blade 204 (less than 0.015 inches) defining a cutting edge 510 would be hardened. In this exemplary embodiment, blade 204 hardness transitions (hard/brittle to soft/ductile) from the cutting edge to the 0.015 inch region. Such blade 204 provides a cutting edge 510 with exceptional sharpness retention but the blade 204 will bend instead of break or fracture. Only tiny micro-chipping on the cutting edge 510 will occur upon severe impacts to hard objects. Such chipping is normal for all blades and acceptable within ANSI standards.

Methods for producing a micro-hardened cutting edge 510 on a soft blade 204 body (less than 0.020 inches hardened) include: induction heat treating; flame hardening; laser heat treating; applying a carbide impregnated material to the cutting edge 510; applying a diamond impregnated material to the cutting edge 510; boronizing; nitriding; flame spray allowing; ferritic nitro-carburizing; applying a composite impregnated material to the cutting edge 510, such as electroless nickel/Teflon application or graphene application; and coating the blade 204 with a material to produce a hardened surface mostly on the cutting edge 510.

Blades 204 according to at least one embodiment of the present invention could be useful in rotary type mowers. The advantages provided by a micro-hardened cutting edge may translate and meet rotary mower safety standard test requirements.

Figure 6:
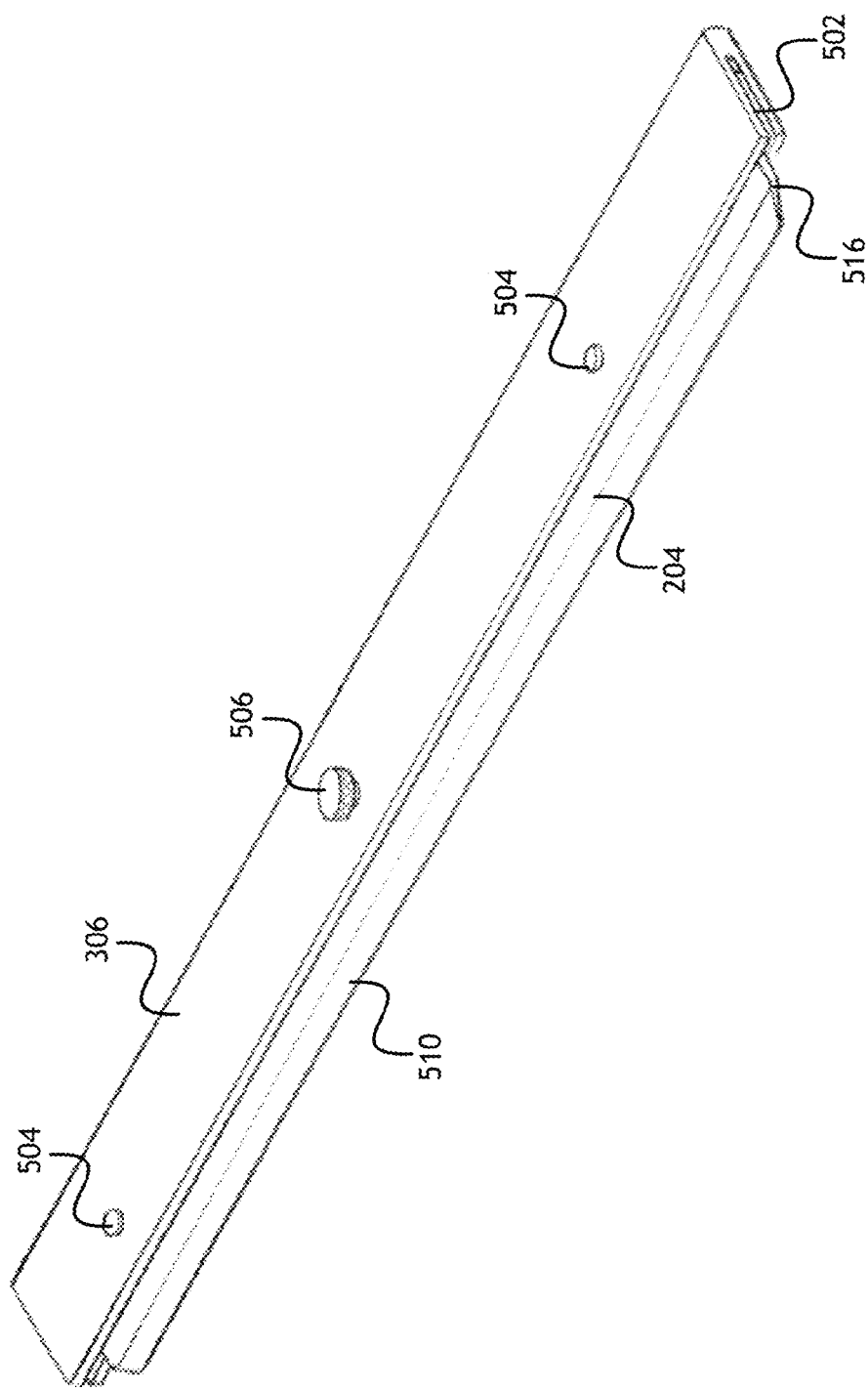
FIG. 6 shows a perspective view of the blade and blade clamp shown in FIG. 5, where the blade is inserted into the blade clamp.

Referring to FIG. 6, a perspective view of the blade 204 and blade clamp 306 shown in FIG. 5, where the blade 204 is inserted into the blade clamp 306, is shown. The blade 204 is inserted into the blade groove 502 defined by the blade calm 306. Locking pins 504 engage locking pin grooves (obscured) defined by the blade 204 to orient the blade 204 and ensure the blade 204 is positioned and oriented correctly with the cutting edge 510 facing out. A locking screw 506 secures the blade 204 in place. The blade 204 may have truncated tips 516 on each end for safety.

Figure 7:
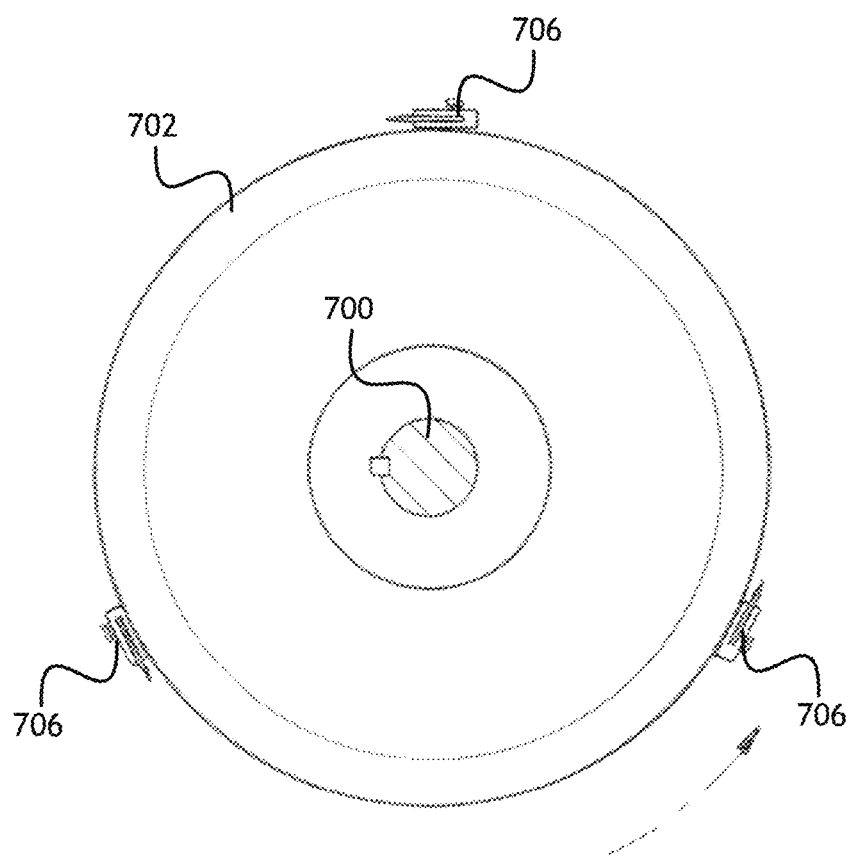
FIG. 7 shows a side view of a blade assembly configured for three blades.

Referring to FIG. 7, a side view of a blade assembly configured for three blades is shown. In at least one embodiment of the present invention, one or more rotors 702 are attached to a shaft 700. Three blade clamps 706 and corresponding blades are attached to the one or more rotors 702 such that the blades are oriented with the cutting edge of each blade facing in the direction of rotation. For example, in FIG. 7, as the shaft 700 rotates counter-clockwise, the rotors 702 are turned counter-clockwise and the blade clamps 706 and blades travel along a trajectory defined by the perimeter of the one or more rotors 702. Where a portion of grass crosses a blade cutting edge, such portion of grass would be cut.

Figure 8:
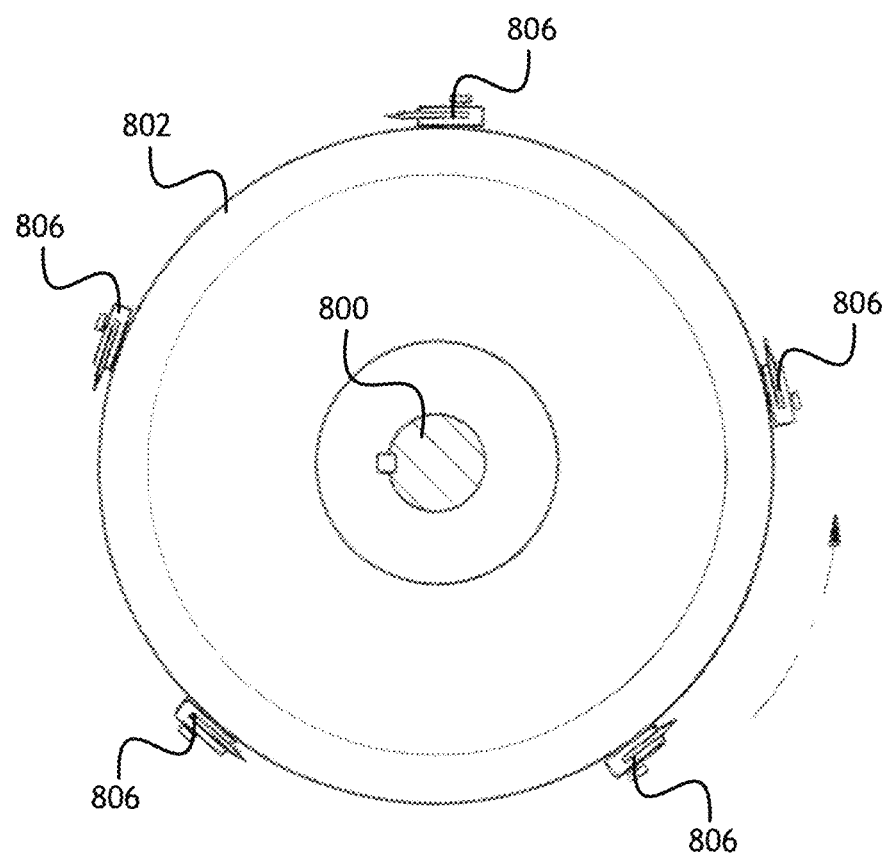
FIG. 8 shows a side view of a blade assembly configured for five blades.

Referring to FIG. 8, a side view of a blade assembly configured for five blades is shown. In at least one embodiment of the present invention, one or more rotors 802 are attached to a shaft 800. Five blade clamps 806 and corresponding blades are attached to the one or more rotors 802 such that the blades are oriented with the cutting edge of each blade facing in the direction of rotation. For example, in FIG. 8, as the shaft 800 rotates counter-clockwise, the rotors 802 are turned counter-clockwise and the blade clamps 806 and blades travel along a trajectory defined by the perimeter of the one or more rotors 802. Where a portion of grass crosses a blade cutting edge, such portion of grass would be cut.

For any number of blade clamps 706, 806 in a blade assembly, the blade clamps 706, 806 should be distributed such that the mass of blade clamps 706, 806 and blades is evenly distributed about an axis of rotation defined by the blade assembly.

Figure 9:
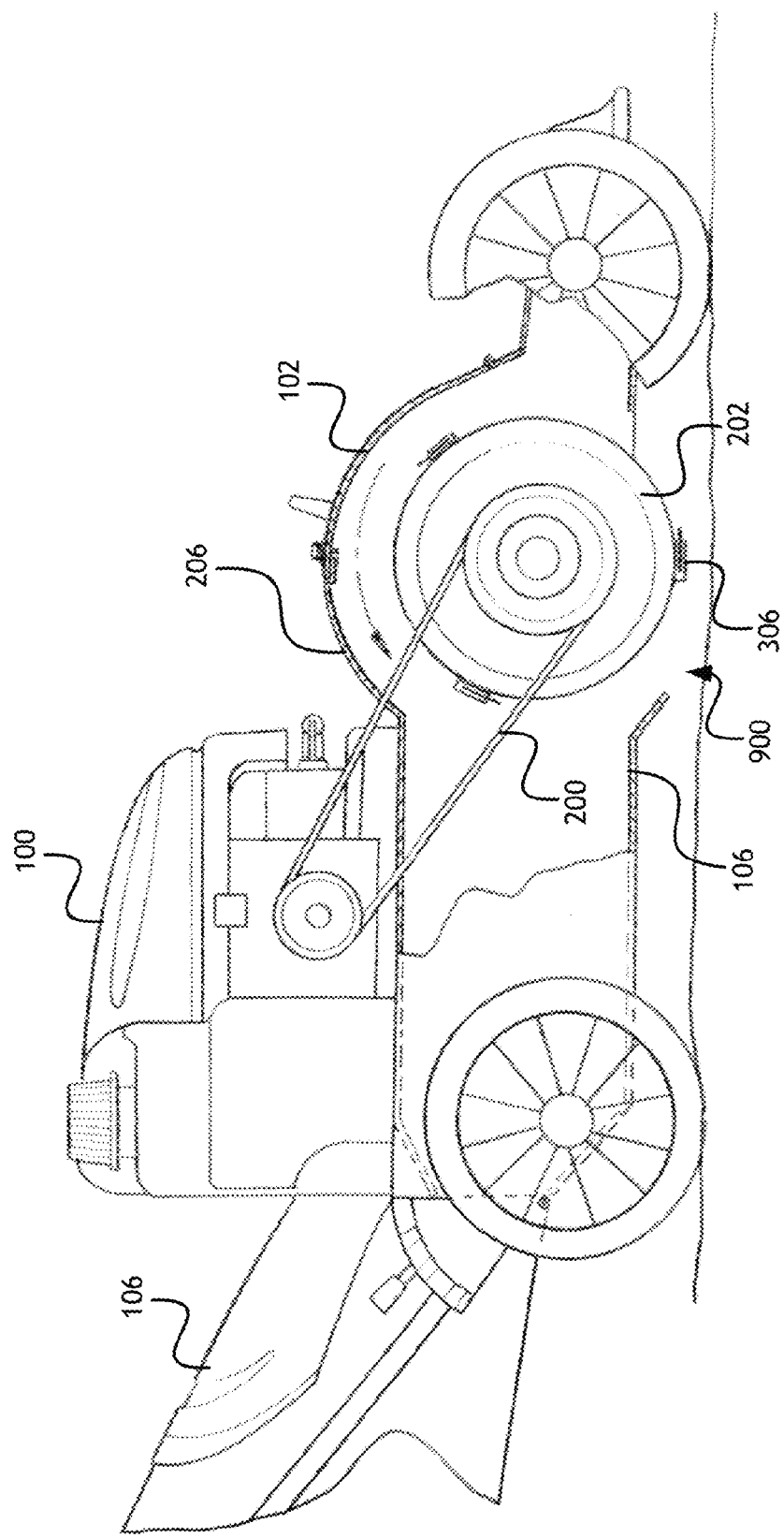
FIG. 9 shows a side, cutout view of a push type lawnmower according to at least one embodiment of the present invention.

Referring to FIG. 9, a side, cutout view of a push type lawnmower according to at least one embodiment of the present invention is shown. In at least one embodiment of the present invention, a lawnmower includes a drive mechanism 100 connected to a blade assembly 202 by a transfer belt 200. The blade assembly 202 may be contained within a blade assembly guard 106. The blade assembly guard 106 may include a ducting portion 206 closely surrounding the blade assembly 202, configured to maintain and direct an airflow produced by the rotation of the blade assembly 202 to direct grass clippings toward a clippings bag 106. The ducting portion 206 may include a blade assembly access panel 102 to allow easy replacement of blades.

The blade assembly guard 106 may also define a blade opening 900 in a portion of the blade assembly guard 106 proximal to the ground. The blade opening 900 allows blades in blade clamps 306 attached to the blade assembly 202 access to grass beneath the blade assembly guard 106. In at least one embodiment, the blade opening 900 is no larger than the diameter of the blade assembly 202. In some embodiments, the dimensions of the blade opening 900 may be defined so as to allow sufficient clearance for blades and blade clamps 306. In other embodiments the dimensions of the blade opening 900 may be defined so as to manipulate airflow.

Figure 10:
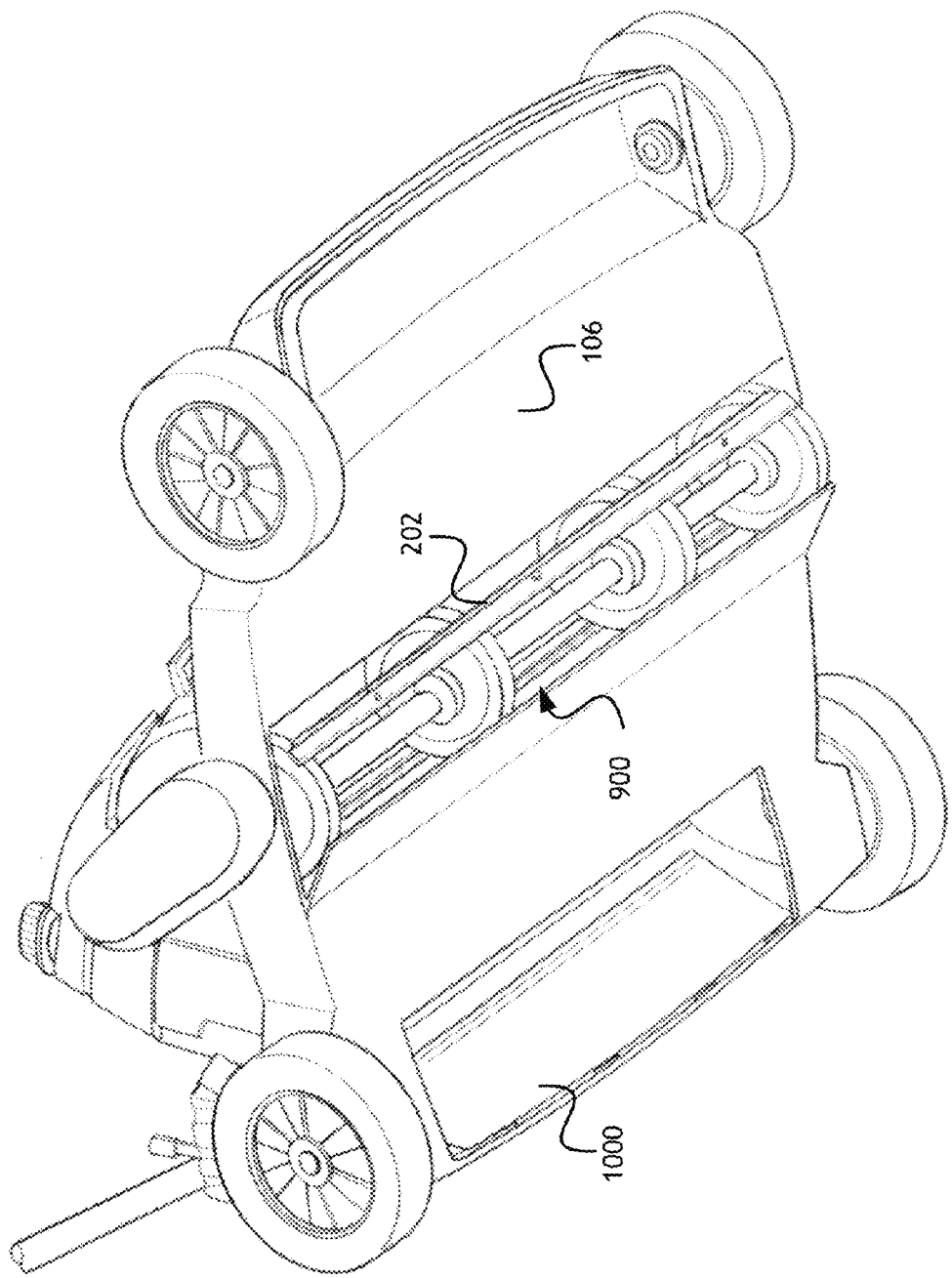
FIG. 10 shows a perspective, bottom view of a push type lawnmower according to at least one embodiment of the present invention having a restricted blade opening.

Referring to FIG. 10, a perspective, bottom view of a push type lawnmower according to at least one embodiment of the present invention having a restricted blade opening 900 is shown. A lawnmower with a blade assembly 202 according to the present invention may have a blade assembly guard 106 to surround the blade assembly 202 and prevent injuries. Because the blade assembly 202 only ever mows a small area of ground at any given moment, the blade assembly guard 106 may restrict access to the blade assembly 202 except in the vicinity of the small area of ground being mowed. The blade assembly guard 106 may also include a clipping access panel 1000. The clipping access panel 1000 may allow access to an interior portion of the blade assembly guard 106 to remove grass clippings that were not expelled to a clippings bag; or the clipping access panel 1000 may allow mulched grass clippings to be expelled in a lawnmower without a clippings bag.

A lawnmower according to the present invention may not require the front of the blade assembly 202 to be exposed to grass. The exposed area of the blade opening 900 under the blade assembly guard 106 is significantly reduced as compared to a rotary blade mower and can easily be located farther from critical front and rear edges. By placing the blade opening 900 farther from the front and rear of the blade assembly guard 106 and keeping the front of the blade assembly 202 shielded, the risk of a blade coming into contact with a body part is reduced. The reduction in operating speed necessary for blades according to embodiments of the present invention also reduces the risk of injury from foreign objects.

Figure 11:
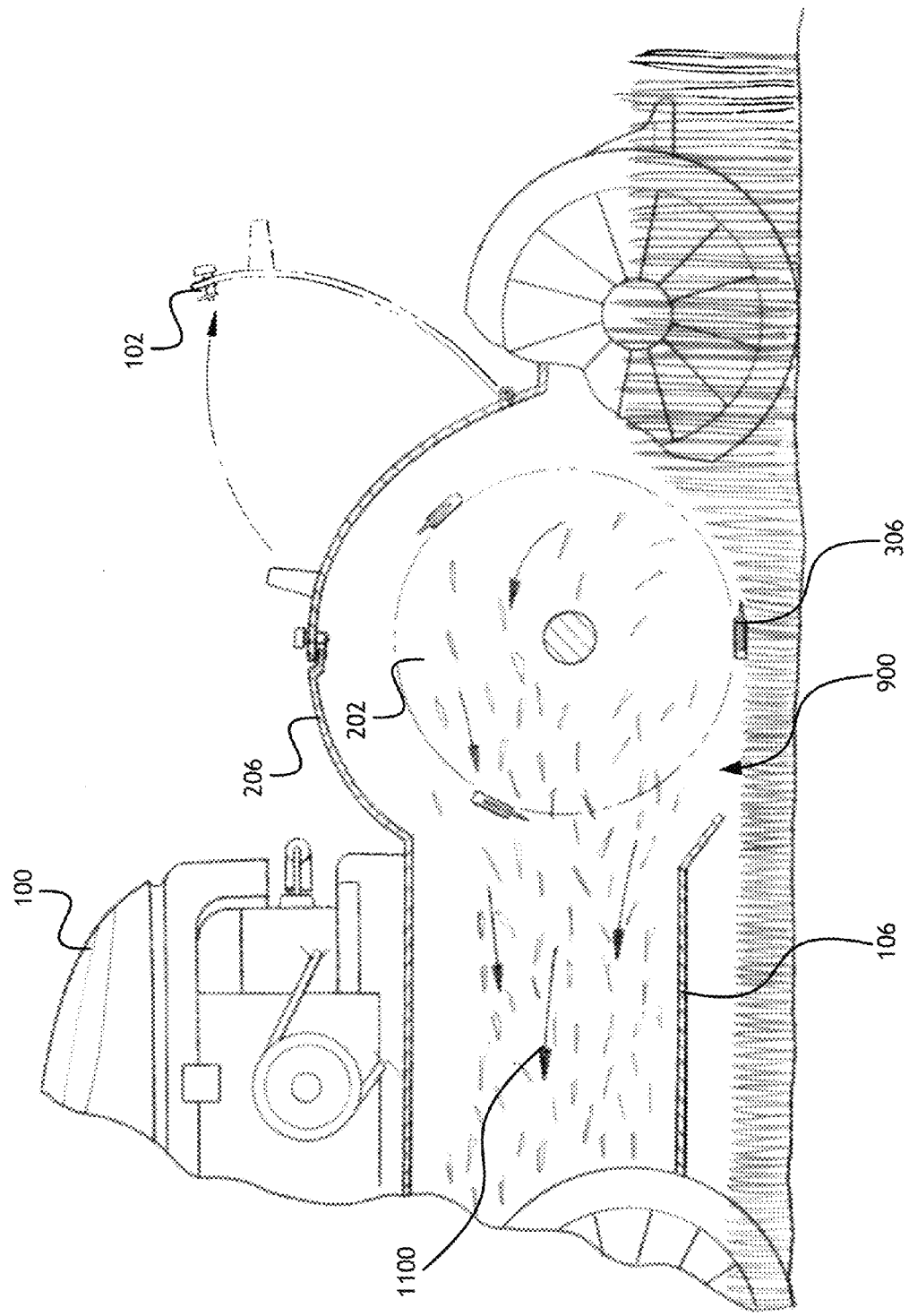
FIG. 11 shows a side, cutout, environmental view of a lawnmower according to at least one embodiment of the present invention illustrating grass cutting and clipping flow.

Referring to FIG. 11, a side, cutout, environmental view of a lawnmower according to at least one embodiment of the present invention illustrating grass cutting and clipping flow is shown. In at least one embodiment of the present invention, a lawnmower includes a drive mechanism 100 connected to a blade assembly 202. The blade assembly 202 may be contained within a blade assembly guard 106. The blade assembly guard 106 may include a ducting portion 206 closely surrounding the blade assembly 202, configured to maintain and direct an airflow 1100 produced by the rotation of the blade assembly 202 to direct grass clippings toward a clippings bag or an opening where mulched grass clippings may be ejected. Whereas directing grass clippings in a rotary mower is inherently difficult, requiring complex deck and blade design, the blade assembly 202 rotation produces a natural lift. The ducting portion 206 may include a blade assembly access panel 102 to allow easy replacement of blades.

The blade assembly guard 106 may also define a blade opening 900 in a portion of the blade assembly guard 106 proximal to the ground. The blade opening 900 allows blades in blade clamps 306 attached to the blade assembly 202 access to grass beneath the blade assembly guard 106. In at least one embodiment, the blade opening 900 is no larger than the diameter of the blade assembly 202. In some embodiments, the dimensions of the blade opening 900 may be defined so as to allow sufficient clearance for blades and blade clamps 306. In other embodiments the dimensions of the blade opening 900 may be defined so as to manipulate airflow 1100.

Figure 12:
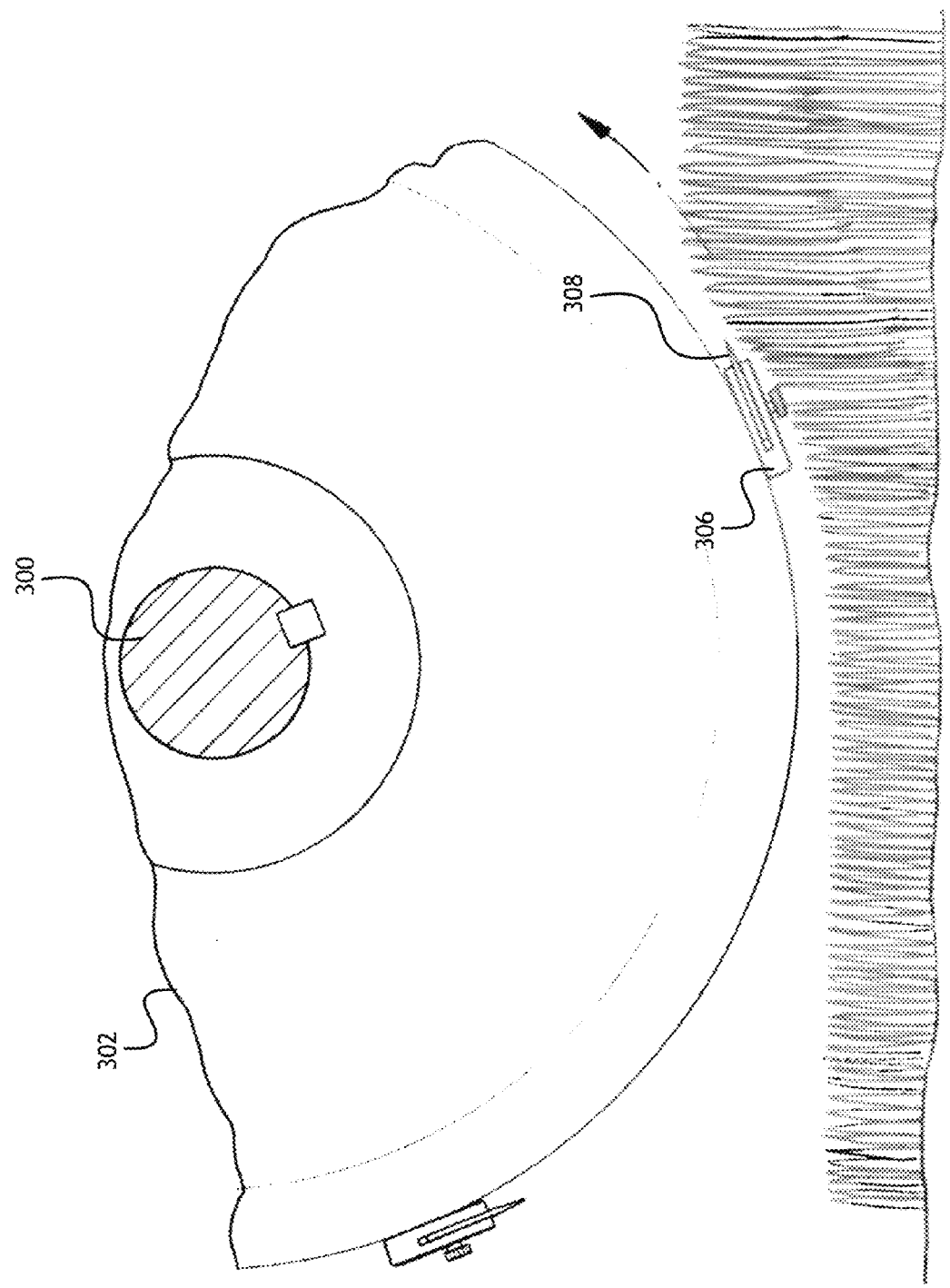
FIG. 12 shows a side, close-up, environmental view of a blade assembly illustrating how grass is cut as the blade assembly rotates.

Referring to FIG. 12, a side, close-up, environmental view of a blade assembly illustrating how grass is cut as the blade assembly rotates is shown. In at least one embodiment of the present invention, a mower has a blade assembly configured to rotate horizontally. The blade assembly may include a shaft 300, rotors 302 connected to the shaft 300, and blade clamps 306 holding blades 308 connected to the rotors 302. As the shaft 300 turns, the cutting edge of each blade 308 cuts any grass its path of travel. Because the blade assembly rotates substantially faster than the forward velocity of any mower, the action of the blade assembly may create a gradient in the length of grass in the immediate vicinity of the blade assembly. For example, grass may be shortest directly below the shaft 300 where the cutting edge of each blade 308 passes closest to the ground, and progressively longer as the blades 308 rotate until the blades 308 reach a point in the rotation when they are no longer cutting any grass. Such mowing action may progressively remove several portions of each blade of grass until the grass is cut to its shortest length. A mower according to at least one embodiment of the present invention effectively mulches grass clippings, and smaller clippings are easier to transport through airflow. The cut ends of grass are substantially similar to those achieved with a reel mower.

The aesthetic quality and health of a lawn cut with a reel mower is far superior to that of a rotary mower. Rotary mowers leave the cut ends ragged while the reel mower's shearing cut leaves cut ends relatively clean. A ragged edge leaves grass more prone to disease. In at least one embodiment of the present invention, the cut quality produced by a horizontal rotary mower may be significantly better than a rotary mower and closely match the cut quality of a reel mower.

Most turf, when not dormant and adequately cared for, grows approximately 1.5 to 2.0 inches per week. The healthiest lawns are maintained at 2.5 to three inches tall and are preferably mowed so as to remove not more than ⅓ of the blade height at any mowing.

Figure 15:
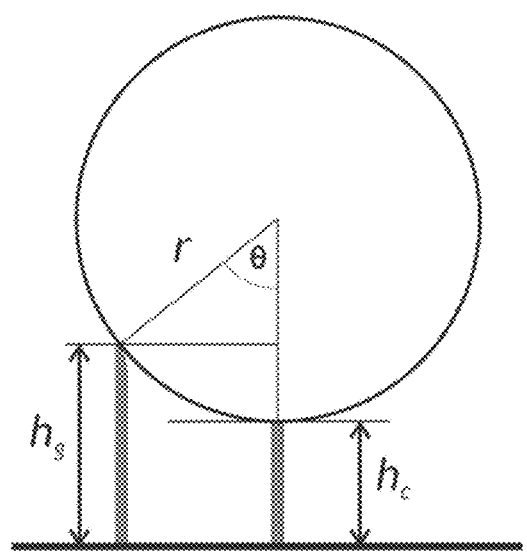
FIG. 15 shows a graphical representation of a path traveled by a blade while mowing.

The time between incidents of cut $t_c$ for any given leaf of grass is approximated by:

$$t_c = \frac{1}{\omega N}$$

Where N is the number of blades and $\omega$ is the angular velocity. The arc length of interface S is given by:

$$S = \left[\cos^{-1}\left(\frac{r + h_c - h_g}{r}\right)\right]r$$

Where r is the radius, $\theta$ is the angle of the cut, $h_c$ is the resultant grass cut height, and $h_g$ is the grass height at the measured cut position as shown in FIG. 15. The blade 308 will arc through a path S over a distance traveled in a cutting direction where grass is being cut. The time required to traverse the ground distance d coextensive with the blade assembly arc length S at the velocity v of the mower in the cutting direction is given by:

$$t = \frac{v}{d}$$

Therefore, n the number of times a single leaf of grass will be cut may be characterized by:

$$n = \frac{t}{t_c} = \frac{v}{d}\omega N$$

Assume three hundred twenty leaves of grass per square inch, and 17.88 leaves of grass per linear inch, and assume a walking speed of two to five miles per hour (5.13 feet per second and 307.8 feet per minute). A mower according to at least one embodiment of the present invention (having three blades 308 and operating with a blade assembly angular velocity of forty-five hundred rotations per minute) would produce 13,500 cuts per minute. 13,500 cuts per minute is equal to approximately forty-four cuts per foot or 3.65 cuts per inch at full cut.

Looking at it another way; as the horizontal rotary mower moves forward in the direction of cutting, each grass leaf encounters a blade 308 cutting edge slightly earlier in each rotation of the blade assembly until the grass leaf is directly below the a shaft driving the blade assembly. At that point the grass leaf has been cut to the cut height $h_c$. Each encounter between a grass leaf and a blade 308 removes a marginal portion of the grass leaf, producing a clipping. The number of clippings can be determined by the number of encounters between a grass leaf and a blade 308 before the grass leaf reaches the cut height $h_c$. The size of each clipping depends on the number of blades 308, the rotational velocity of the blade assembly and the velocity v of the mower in a cutting direction. According to the previous example, a horizontal rotary mower with three blades 308 operating at four thousand five hundred rotations per minute and traveling at a forward velocity of 307.8 feet per minute would travel approximately 0.27 inches between encounters with any particular grass leaf. The change in the relative position of each successive blade 308 during encounters with a particular grass leaf is approximately:

$$\theta = \sin^{-1}\left(\frac{v}{\omega Nr}\right)$$

In the continuing example, each blade 308 encounters the grass leaf approximately 6.288° earlier than the previous blade 308. The marginal change in the length of each clipping for a particular grass leaf is therefore approximated by:

$$(1-\cos\theta)r$$

According to the continuing example, a horizontal rotary mower will create progressively smaller clippings for each grass leaf until the final clipping would be just 0.015 inches.

The number of cuts of grass G can be defined by:

$$G = \left[\frac{\omega N}{v}\right][l][\sigma]$$

Where N is the number of blades, ω is the angular velocity, v is the velocity of the mower in the cutting direction, σ is the grass density (number of grass leaves per square foot) and l is the blade width. Based on these relations, and assuming a constant grass leaf density (46,000 leaves or blades per square foot) and a constant velocity of the mower in the cutting direction v=307.8 feet per minute, prior art rotary mower operating at a blade rotational speed ω of 3,000 rotations per minute may produce approximately 7,000,000 cuts of grass leaves per linear foot. In contrast, a horizontal rotary mower according to at least one embodiment of the present invention with three blades 308 and operating at four thousand five hundred rotations per minute may produce 40,550,000 cuts of grass leaves per linear foot; 5.8 times more than the rotary mower. This means that grass clippings are much more finely mulched with a mower according to at least one embodiment of the present invention. Finer clippings result in greater nutrient availability if the clippings are left on the lawn.

Figure 13:
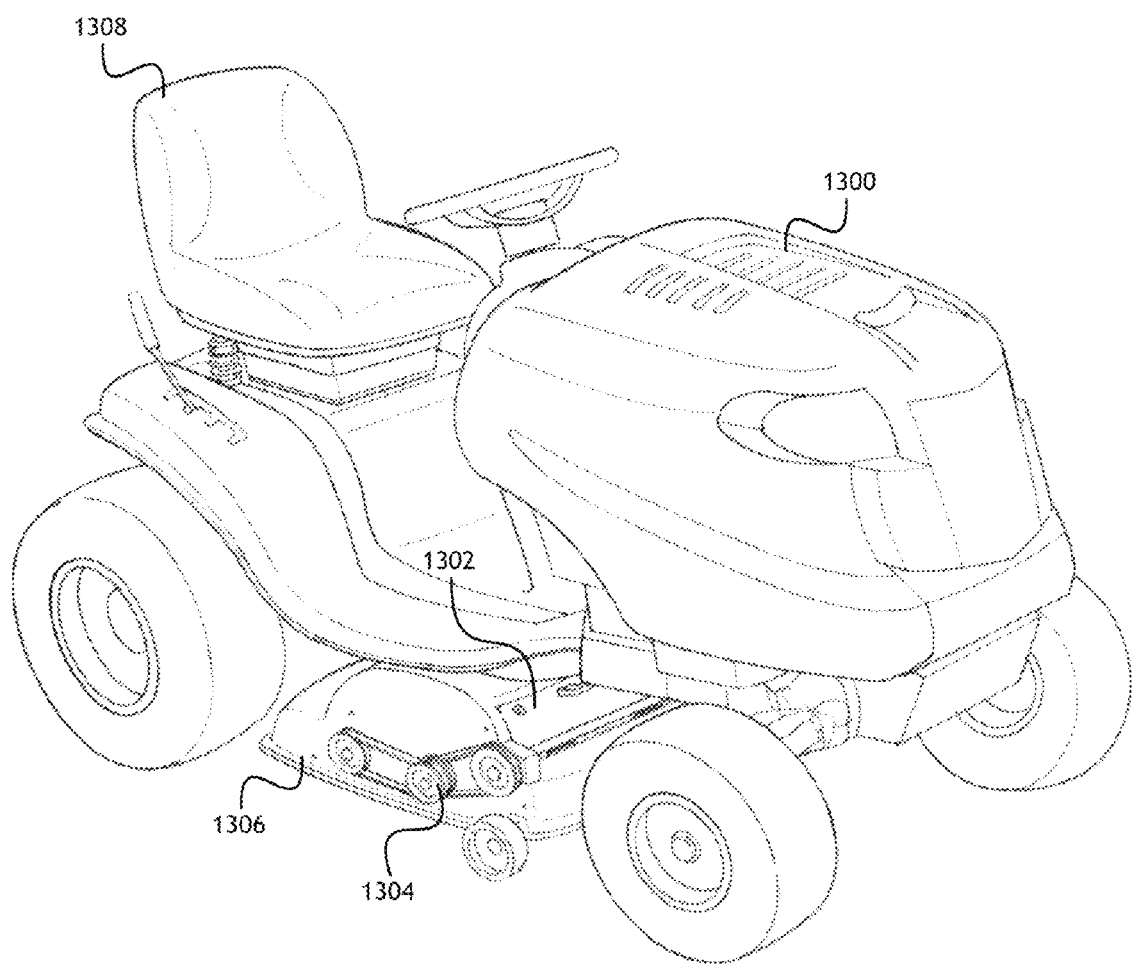
FIG. 13 shows a perspective view of riding type lawnmower according to at least one embodiment of the present invention.

Referring to FIG. 13, a perspective view of riding type lawnmower according to at least one embodiment of the present invention is shown. In at least one embodiment of the present invention, a lawnmower includes an operator seat 1308 and a drive mechanism 1300 connected to a blade assembly through a power transfer mechanism 1304 such as one or more belts. The blade assembly may be contained within an undermounted blade assembly guard 1306 with a blade assembly access panel 1302 to allow maintenance and replacement of blades in the blade assembly. A blade assembly useful in this embodiment of the present invention may be as described herein.

Figure 14:
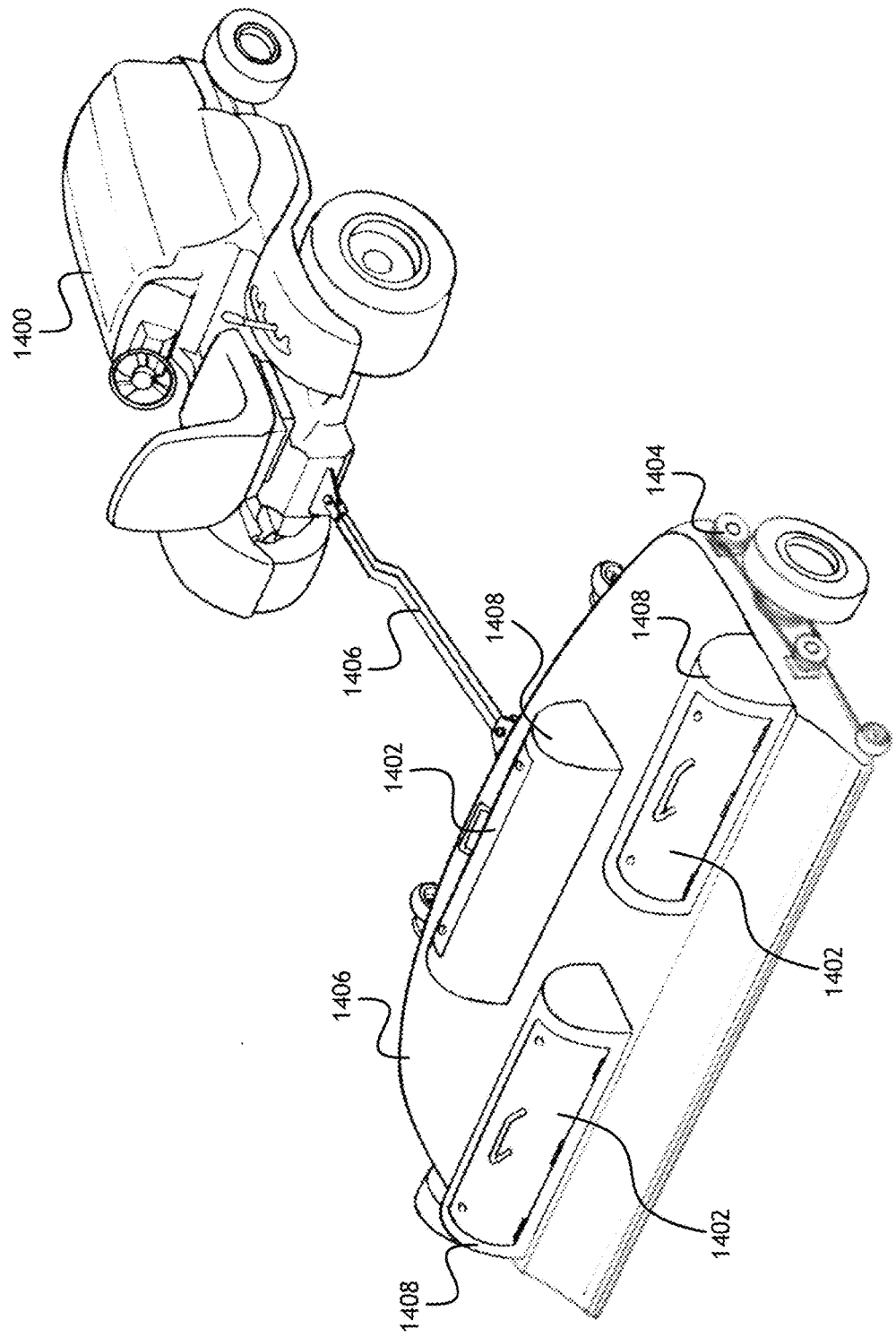
FIG. 14 shows a perspective view of a commercial mower deck according to at least one embodiment of the present invention pulled behind a tractor.

Referring to FIG. 14, a perspective view of a commercial mower deck according to at least one embodiment of the present invention pulled behind a tractor is shown. In one embodiment of the present invention, a tractor 1400 is connected to a mower deck 1406 through a towing connector 1406 which may include a power transfer mechanism such as a power take-off. Alternatively, the towing connector 1406 may connect the tractor 1400 to the mower deck 1406 for towing while one or more blade assemblies are powered through other means such as a power transfer mechanism 1404 connecting the one or more blade assemblies to one or more mower deck 1406 wheels.

The mower deck 1406 may include one or more blade assembly guards 1408, each blade assembly guard 1408 housing a blade assembly according to embodiments of the present invention. Each blade assembly guard may include a blade assembly access panel 1402 to allow blades in the corresponding blade assembly to be replaced.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A rotatable blade assembly for a mowing device comprising:
   two or more rotors configured to rotate about an axis substantially parallel to a surface to be cut, each rotor comprising a plurality of blade holding elements defining a blade channel no more than 0.075 inches thick configured to hold a blade; and
   a plurality of blades, each no more than 0.075 inches thick, each of the plurality of blades comprising:
      a ductile portion having a hardness less than Rockwell C 50; and
      a hardened cutting edge having hardness of at least Rockwell C 50,
   wherein:
      each of the plurality of blades is held in one of the plurality of blade holding elements in each of the two or more rotors; and
      the rotatable blade assembly is rotatable about the axis such that each of the plurality of blades is held substantially tangentially to each of the two or more rotors such that a cutting edge of each of the plurality of blades is oriented in a direction of rotation of the two or more rotors to cut grass without a stationary bedknife.

2. The rotatable blade assembly of claim 1, wherein the hardened cutting edge is bi-metalized.

3. The rotatable blade assembly of claim 1, wherein the hardened cutting edge is boronized.

4. The rotatable blade assembly of claim 1, wherein the hardened cutting edge is nitridized.

5. The rotatable blade assembly of claim 1, wherein the hardened cutting edge is flame hardened.

6. The rotatable blade assembly of claim 1, wherein the hardened cutting edge is induction heat treated.

7. The rotatable blade assembly of claim 1, wherein the hardened cutting edge is laser heat treated.

8. The rotatable blade assembly of claim 1, wherein the hardened cutting edge is ferritic nitro-carburized.

9. The rotatable blade assembly of claim 1, wherein the hardened cutting edge is graphene infused.

10. A lawn mower having a rotatable blade assembly comprising:
    two or more rotors configured to rotate about an axis substantially parallel to a surface to be cut, each rotor comprising a plurality of blade holding elements defining a blade channel no more than 0.075 inches thick configured to hold a blade; and
    a plurality of blades, each no more than 0.075 inches thick, each of the plurality of blades comprising:
       a ductile portion having a hardness less than Rockwell C 50; and
       a hardened cutting edge having hardness of at least Rockwell C 50,
    wherein:
       each of the plurality of blades is held in one of the plurality of blade holding elements in each of the two or more rotors; and
       the rotatable blade assembly is rotatable about the axis such that each of the plurality of blades is held substantially tangentially to each of the two or more rotors such that a cutting edge of each of the plurality of blades is oriented in a direction of rotation of the two or more rotors to cut grass without a stationary bedknife.

11. The lawn mower of claim 10, wherein the hardened cutting edge is bi-metalized.

12. The lawn mower of claim 10, wherein the hardened cutting edge is boronized.

13. The lawn mower of claim 10, wherein the hardened cutting edge is nitridized.

14. The lawn mower of claim 10, wherein the hardened cutting edge is flame hardened.

15. The lawn mower of claim 10, wherein the hardened cutting edge is induction heat treated.

16. The lawn mower of claim 10, wherein the hardened cutting edge is laser heat treated.

17. The lawn mower of claim 10, wherein the hardened cutting edge is ferritic nitro carburized.

18. The lawn mower of claim 10, wherein the hardened cutting edge is graphene infused.

* * * * *